(12) United States Patent
Carter (10) Patent No.: US 10,070,308 B2
(45) Date of Patent: Sep. 4, 2018

(54) SYSTEMS AND METHODS FOR PROTECTING MOBILE CONTACT INFORMATION

(71) Applicant: Google Inc., Mountain View, CA (US)

(72) Inventor: Bernadette Alexia Carter, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 13 days.

(21) Appl. No.: 15/188,431

(22) Filed: Jun. 21, 2016

(65) Prior Publication Data
US 2017/0366966 A1    Dec. 21, 2017

(51) Int. Cl.
| | |
|---|---|
| H04M 1/66 | (2006.01) |
| H04W 12/02 | (2009.01) |
| G06F 21/62 | (2013.01) |
| H04M 3/42 | (2006.01) |
| H04M 1/56 | (2006.01) |
| G05B 19/00 | (2006.01) |

(52) U.S. Cl.
CPC .......... *H04W 12/02* (2013.01); *G06F 21/629* (2013.01); *G06F 21/6245* (2013.01)

(58) Field of Classification Search
CPC ... H04W 12/02; G06F 21/6245; G06F 21/629
USPC ....................................................... 455/411
See application file for complete search history.

(56) References Cited

U.S. PATENT DOCUMENTS

| | | | | |
|---|---|---|---|---|
| 8,086,688 B1 * | 12/2011 | Bacastow | ............. | G06F 21/305 709/213 |
| 8,755,772 B1 * | 6/2014 | Natsis | ............. | H04M 1/274516 455/412.1 |
| 2007/0081649 A1 | 4/2007 | Baudino et al. | | |
| 2013/0276134 A1 * | 10/2013 | Meredith | ................ | G06F 21/00 726/27 |

* cited by examiner

*Primary Examiner* — Huy C Ho
(74) *Attorney, Agent, or Firm* — Colby Nipper (57) ABSTRACT

The disclosed technology includes techniques for allowing a contact to exercise control over a third party's sharing of the contact's mobile contact information with mobile applications. A contact may create an application contact key containing rules that govern when a third party may share the contact information with mobile applications. The application contact key may be stored in association with the contact information on a third party's mobile device, on a remote server, or as part of a social networking website. The application contact key may instruct the mobile device whether or not to share the contact information with a particular mobile application. Further, an application contact import management system may track all requests from various mobile applications to access the contact information, and may provide for a seamless future on-boarding experience in the event the contact later decides to accept a previously denied request to share the contact information.

20 Claims, 5 Drawing Sheets

SYSTEMS AND METHODS FOR PROTECTING MOBILE CONTACT INFORMATION

BACKGROUND

It has become common for mobile applications, such as, for example, mobile gaming applications, mobile service applications, and mobile social networking applications, to seek access to a user's contact list. A mobile application may seek to access a user's contact list in order to send download invites to the user's contacts in order to increase downloads of the mobile application. A mobile application may also use the user's contact list to attempt to determine which of the user's contacts have already downloaded the mobile application to establish engagement opportunities between the user and the contact through the mobile application. For example, if a user and their contact both have the same mobile game installed, the mobile game may attempt to connect them through the mobile application so that they may play the game together. While these may be useful functions that enhance the usefulness of the mobile application, they may also present privacy issues for contacts who do not want their information shared with unauthorized mobile applications.

Contact information stored in a mobile device may typically include a contact's name, phone number, email address, work address, home address, birthday, work place, photo, and other such information. Many people may not want to share this information with unknown third parties, however, as this information may be contained in shareable format within the device of another person, traditionally they may have to rely on the decisions of that person as to whether or not their private information is shared with various mobile applications or other entities. Furthermore, in many cases, even if the owner of the contact list is sensitive to the privacy concerns of a particular contact, many mobile applications request access to the entire contact list and may not allow for selection control of which contacts' information is shared and which is not. Even if a contact does not mind having their information shared with a mobile application, the user may nonetheless not want to receive unsolicited contact from a mobile application.

A separate problem can arise if, by virtue of having access to a user's contact list, a mobile application attempts to import a contact's contact information and is denied. In this case, the contact may have a series of previously missed attempts to connect with friends through various mobile applications. But, if the contact later changes their mind and wishes to engage with the mobile application, those past attempts to connect from friends will be lost. For example, a first user may have a mobile application game on their smart phone and the mobile application game may attempt to engage a second user by, for example, inviting the second user to download the mobile application game and connect with the first user. The second user may deny the request to download the mobile application game and connect with the first user, but if the second user decides to download the mobile application game at a later date, the second user will not be automatically connected with the first user as they would have been if they had originally accepted the invite to download the mobile application game and connect with the first user. Accordingly, it is desirable to provide a system to allow a user to exercise control over the sharing of their contact information by another. It is further desirable to provide a system that may allow a user to share their contact list with a mobile application without worrying about whether the mobile application may attempt to initiate unwanted contact with the contacts.

BRIEF DESCRIPTION OF THE FIGURES

Reference will now be made to the accompanying figures and flow diagrams, which are not necessarily drawn to scale, and wherein.

DETAILED DESCRIPTION

As described herein, embodiments of the disclosed technology include techniques for allowing a contact to exercise a degree of control over the extent to which their contact information is shared with mobile applications by third parties. References may be made to a "contact list" throughout this disclosure. A contact list will be understood to mean a list of one or more data records, wherein each data record is associated with a particular individual or entity and each data record contains contact information associated with that particular individual or entity. A contact data record may be, for example, a vCard or any other such file format used to store contact information. Accordingly, a contact list may be a single file stored on a mobile device, such as, for example, a user's phone book. A contact list may also include data that is accessible by the mobile device but is stored on a remote server. For example, a contact list may include contacts connected to the user through a social networking website or application.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for enabling a contact to control sharing of their mobile contact information by a user of a mobile, and will now be described with reference to the accompanying figures. Embodiments of the disclosed technology may enable a contact to set rules, using an application contact key, governing whether or not to automatically include their contact information in any future mobile application contact list imports initiated on a third party's device. Another feature of the disclosed technology includes the use of an application contact import management system to track all previous attempts by mobile applications to access the contact's contact information. According to some embodiments, the application contact import management system may enable a contact to automatically connect with friends who have made previous attempts to connect with the contact through a mobile application.

Figure 1:
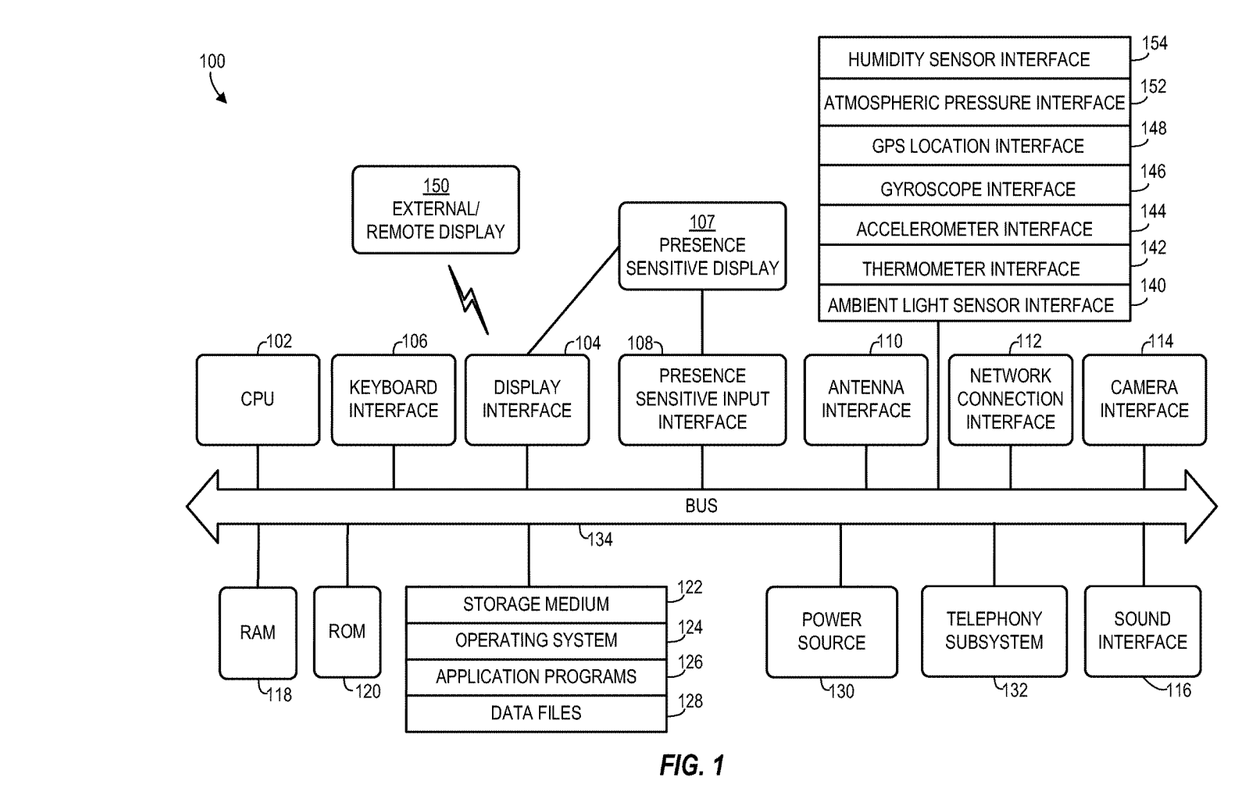
FIG. 1 depicts a block diagram of illustrative computing device architecture 100, according to an example embodiment.

FIG. 1 depicts a block diagram of illustrative computing device architecture 100, according to an example embodiment. Certain aspects of FIG. 1 may be embodied in a computing device (for example, a mobile computing device). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain embodiments of the disclosed technology, the display interface 104 may be directly connected to a local display, such as a touch-screen display associated with a mobile computing device. In another example embodiment, the display interface 104 may be configured for providing data, images, and other information for an external/remote display that is not necessarily physically connected to the mobile computing device. For example, a desktop monitor may be utilized for mirroring graphics and other information that is presented on a mobile computing device. In some embodiments, the display interface 104 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example embodiment, the computing device architecture 100 may include a presence-sensitive display interface 107 for connecting to a presence-sensitive display. According to some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

Example embodiments of the computing device architecture 100 may include various interfaces that provide communication interfaces to various sensors for data gathering. In certain embodiments, an ambient light sensor interface 140 is provided as a communication interface and provides functions for obtaining light data from an ambient light sensor. In certain embodiments, a thermometer interface 142 is provided as a communication interface and provides functions for capturing temperature data from a temperature sensor. In certain embodiments, an accelerometer interface 144 is provided as a communication interface and provides functions for obtaining accelerometer data from an accelerometer. In certain embodiments, a gyroscop interface 146 is provided as a communication interface and provides functions for obtaining gyroscope data from a gyroscope. In certain embodiments, a GPS location interface 148 is provided as a communication interface and provides functions for obtaining location data from a GPS receiver. In certain embodiments, an atmospheric pressure interface 152 is provided as a communication interface and provides functions for obtaining pressure data from a pressure sensor. In certain embodiments, a humidity interface 154 is provided as a communication interface and provides functions for obtaining humidity data from a humidity sensor.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the transmission and receipt of sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
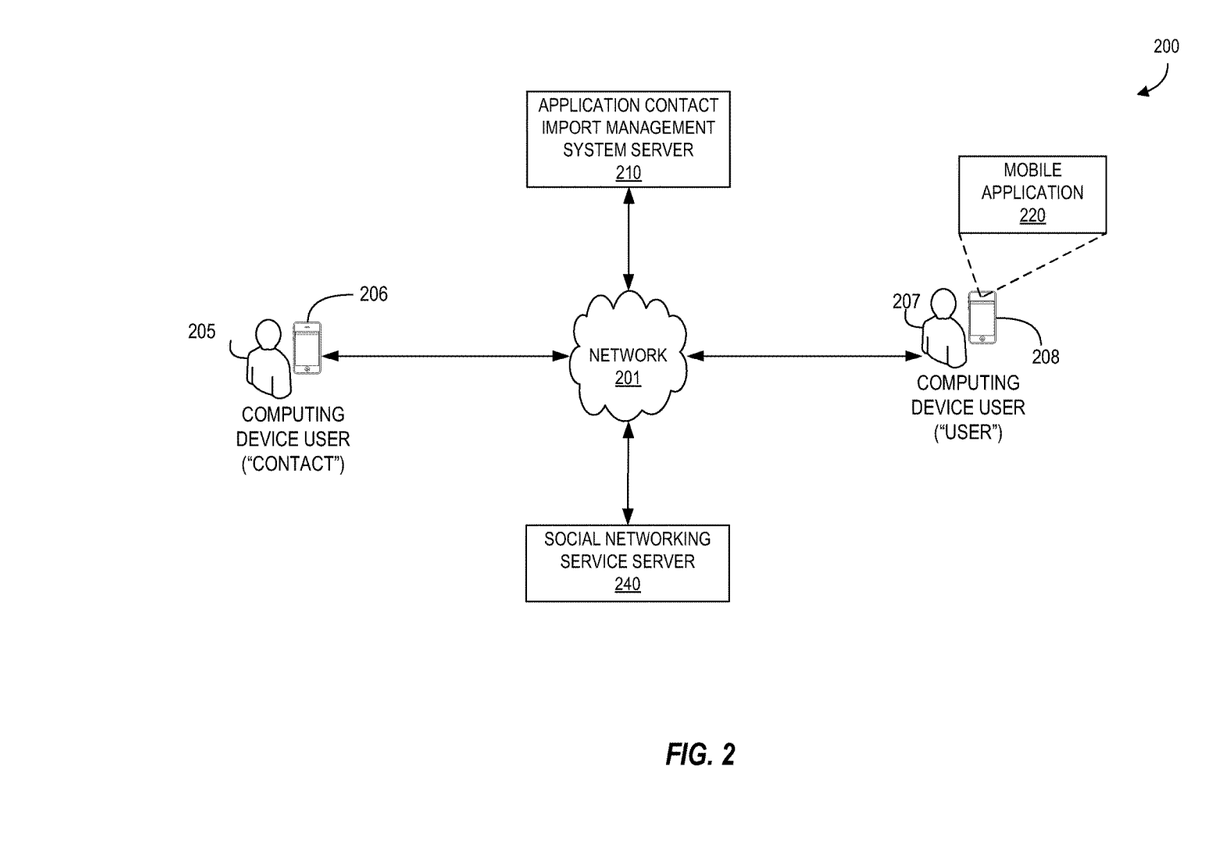
FIG. 2 is an overview of an environment 200 illustrating components that may be included in a system for protecting mobile contact information, according to an example embodiment.

FIG. 2 depicts an overview of an environment 200 illustrating components that may be included in a system for protecting mobile contact information according to an example embodiment. According to some embodiments a contact 205 having a first mobile device 206 may communicate via a network 201 with a user 207 having a second mobile device 208. The second mobile device 208 may include a contact list, such as an address book, that includes a plurality of contacts records. Each contact record may include the contact information of a contact 205. The second mobile device 208 may further include a mobile application 220 that desires to access the contact record of the contact 205. As will be described below in greater detail, the contact record of the contact 205 may have an application contact key associated with it. According to various embodiments, the application contact key may be 1) present on the second mobile device 208, 2) stored on an application import management system server 210, or 3) stored on a social networking service server 240. The application contact key may provide instructions to the second computing device 208 regarding whether the computing device 208 is authorized to share the contact information with the mobile application 220. In instances where the application contact key is not stored on the second mobile device 208, the second mobile device 208 may access the application contact key on the application contact import management system server 210, the social networking service server 240, or another remote server, via the network 201.

According to some embodiments, the disclosed technology may enable a contact to control sharing of their contact information through use of an application contact key. An application contact key may allow a contact to specify rules that govern when their contact information may be shared. In some embodiments, an application contact key may be a data file associated with a particular contact that specifies the sharing preferences of the associated contact. In some embodiments, an application contact key may be stored on a third party's mobile device, such as a friend's smart phone, in association with a contact's contact information. According to some embodiments, an application contact key may be provided to a third party's device via a medium such as email, SMS, or any other such file transfer medium. According to some embodiments, upon receiving an application contact key, the mobile device may associate the application contact key with the contact information of the contact. For example, the application contact key may be stored as part of the data record that includes the contact's contact information. In some embodiments, an application contact key sent by SMS may be associated with the phone number of the sending device, which may then be associated with the contact record on the mobile device that contains that phone number. Similarly, if an application contact key is sent to a mobile device via email, the mobile device may associate the application contact key with the contact record that contains the originating email address. Those of skill in the art will appreciate that these are merely examples of ways to transmit an application contact key from a contact to a user of a mobile device and associate the application contact key with the contact's contact information and that many other file transfer methods may be used.

In some embodiments, an application contact key may be stored and remotely accessed by a mobile device. For example, in some embodiments, an application contact key may be stored on a server that is accessible by a mobile device. Further, in some embodiments an application contact key may be stored on a server run by a social networking site. In such instances, the application contact key may be associated with the contact's user profile on the social networking site. According to some embodiments, a mobile device may retrieve a contact's application contact key from the server in response to receiving a request by a mobile application to access the contact's contact information. Furthermore, in some embodiments, an application contact key may be stored on a server run by a mobile application vendor and/or distributor.

According to some embodiments, rules specified by a contact regarding the sharing of the contact's contact information may be stored within the application contact key itself. In some embodiments, the application contact key may serve as a pointer and the rules may be stored in a remote server that may be accessed by a mobile device upon receipt of a share request from a mobile application. For example, in some embodiments the rules may be stored in the application contact import management system. Regardless of where the rules are stored, according to some embodiments, upon a mobile device receiving a request from a mobile application to access a contact's contact information, a processor may access the application contact key and responsive to accessing the rules, may make a determination resulting in a Boolean yes or no regarding whether the contact information may be shared with the mobile application. The mobile device may then share or deny sharing of the contact information with the mobile application based on the resulting determination based on the rules.

According to some embodiments, an application contact key may be created using an application access management service. In some embodiments, an application access management service may be, for example, a website or mobile application that a contact may use to access, request, or create an application contact key. For example, a contact may have an account with the application access management service and may login and input sharing preferences to be associated with their application contact key. According to some embodiments, the sharing preferences may be expressed as rules regarding when and with whom to share the contact's contact information. The application access management service may receive indications of a contact's sharing preferences from the contact and may create an application contact key associated with that contact based on the sharing preferences. In some embodiments, the application access management service may provide the application contact key to the contact so that the contact may distribute it to third parties. In some embodiments, the application access management service may include a server that stores, maintains, and provides third parties with access to a contact's application contact key so that it may be remotely accessed.

As described above, an application contact key may include rules which may instruct the mobile device and/or a mobile application whether or not sharing the contact's contact information with the mobile application is permitted, and to what extent sharing is permitted. Accordingly, when a mobile device receives a request from a mobile application to perform an import of a user's contact list, any record in the contact list that has an associated application contact key may instruct the mobile device and/or mobile application whether a contact record import is permitted with respect to that contact. For example, in some embodiments, the application contact key may be configured by the contact to use one of several modes, including modes that will cause a processor to 1) automatically include the contact's contact information in any future mobile application contact list import requests from a mobile application, 2) automatically exclude the contact's contact information from any future mobile application contact list import requests from a mobile application, or 3) notify the contact of the contact list import request from the mobile application and provide the contact with the ability to allow or deny the request. It should be understood that these examples are non-limiting and any number of individual rules or combinations of rules may be contemplated herein.

In some embodiments, rules may be designed to incorporate aspects of metadata relating to a mobile application. For example, in some embodiments a contact may be able to specify that they do not want to share their contact information with any mobile application that performs location tracking by, for example, accessing the GPS functionality of the mobile device. In some embodiments, the rules may be related to the owners of the mobile devices. In other words, in some embodiments, a contact may specify that particular friends may share their contact information with mobile applications and others may not. In some embodiments, the system may automatically modify the rules using predictive intelligence. For example, the system may modify the rules based on the contact's history of accepting and denying access to various mobile applications. In some embodiments, the system may modify the rules based on observations of the contact's behavior. For example, if the system receives information that the contact has expressed (through email for example, or on a social networking site) an opinion about a certain type of mobile application, the system may modify the rules in accordance with that observed opinion.

According to some embodiments, an application contact key may be configured to automatically include a contact's contact information in any future mobile application import requests from a mobile application. However, in some embodiments, a contact may also specify rules associated with the application contact key that limit what types of applications their contact information may be automatically shared with. For example, a contact may specify that a mobile device is authorized to share their contact information with sports and productivity mobile applications, but not with gaming mobile applications. According to some embodiments, the system may determine what the type (e.g., "sports," "productivity," "gaming," etc.) of an application is based on a classification associated with the mobile application by, for example, a mobile application store. In some embodiments, particular mobile application classifications may be determined by system administrators and stored on a server. According to some embodiments, in addition to granting the mobile application access to the contact information, an "application contact import management system" may store a unique application ID corresponding to the identity of the mobile application requesting the contact list import, metadata associated with the attempted import session, and a user code that corresponds to the identity of the user of the mobile device associated with the contact list that is the subject of the import request. According to some embodiments, such metadata may include the category or type of mobile application requesting access to the contact information, how often the mobile application is used, average usage time, or any other metric or information that may be desirable to know. The unique application ID may be used to keep track of which mobile applications a contact's contact information has been shared with. Thus, a contact may be enabled to monitor which mobile applications their contact information has been shared with. In some embodiments, a mobile application may be configured to allow a contact to remove their contact information from the mobile application via the application contact import management system.

According to some embodiments, the rules associated with an application contact key may be configured to automatically exclude a contact's contact information in any future mobile application import requests from a mobile application. In these instances, the mobile application will be prevented from importing the contact's contact information. However, despite preventing the sharing of the contact's contact information with the mobile application, according to some embodiments, a unique application ID and user code associated with the import request from the mobile application may nonetheless be stored on the "application contact import management system" for future use. Thus, for any import request that has been denied by the application contact key, the application contact import management system may store a record indicating the identity of the requesting mobile application and the identity of the owner of the mobile device. Accordingly, if a contact later decides to allow sharing of their contact information with a particular mobile application that was previously denied, the system may be able to access the data stored in the application contact import management system to determine, by comparing the unique application ID of the mobile application against known application IDs of mobile applications and comparing user codes against known user codes of other users, 1) if there have been any previous attempts by the particular mobile application to import the contact's contact information, and if so, then 2) which mobile devices or users were connected with the import requests. Consequently, upon authorization of sharing of contact information with the particular mobile application, the contact may be automatically connected with other users that had previously sought to engage the contact through the mobile application, providing a seamless on-boarding experience. For example, if John downloads a game, such as a chess mobile application, and the chess mobile application requests access to Tom's contact information, but is denied due to the settings of Tom's application contact key, the system will store a unique application ID corresponding to the chess mobile application and a user code corresponding to John in the application contact import management system. When Tom later decides to download the chess mobile application, the system may access the application contact import management system and determine that Tom has previously received a request to connect in the chess mobile application from John, and the system may automatically connect Tom with John via the chess mobile application so that they may now use the chess mobile application to play against each other. This may allow Tom to salvage the previously denied request from John, while protecting Tom's contact information from being shared until he has authorized sharing of his contact information with the mobile application.

According to some embodiments, an application contact key may be configured to cause a notification to be sent to a contact notifying the contact of the contact list import request from the mobile application and providing the contact with the ability to allow or deny the request. In some embodiments, when a mobile application requests access to the contact's contact information, a processor of the user's mobile device may instruct the processor not to allow or deny access to the contact information until instructions have been received from the contact. Accordingly, in response to accessing the application contact key, the mobile device may cause a notification to be sent to the contact and a prompt requesting the authorization or denial of sharing of the contact's contact information. In some embodiments, the mobile device may directly send a message to the mobile device of the contact, by for example, SMS or email. In some embodiments, the mobile device may communicate the notification and/or request to the application access management system and the application access management system may communicate with the contact to solicit a response to the access request. As those of skill in the art will appreciate, there are many possible implementations of a system for notifying the contact of the request and soliciting a response. Upon receiving instructions from the contact, a processor of the mobile device may cause the contact's contact information to be shared with the mobile application or may exclude the contact's contact information from sharing with the mobile application. As will be appreciated, this system may place the decision of whether to share a contact's information with a mobile application in the hands of the contact themselves. Regardless of whether the contact authorizes sharing of the contact information or not, the application contact import management system may nonetheless store the unique application ID associated with the mobile application and the user code associated with the user, as described above.

Figure 3:
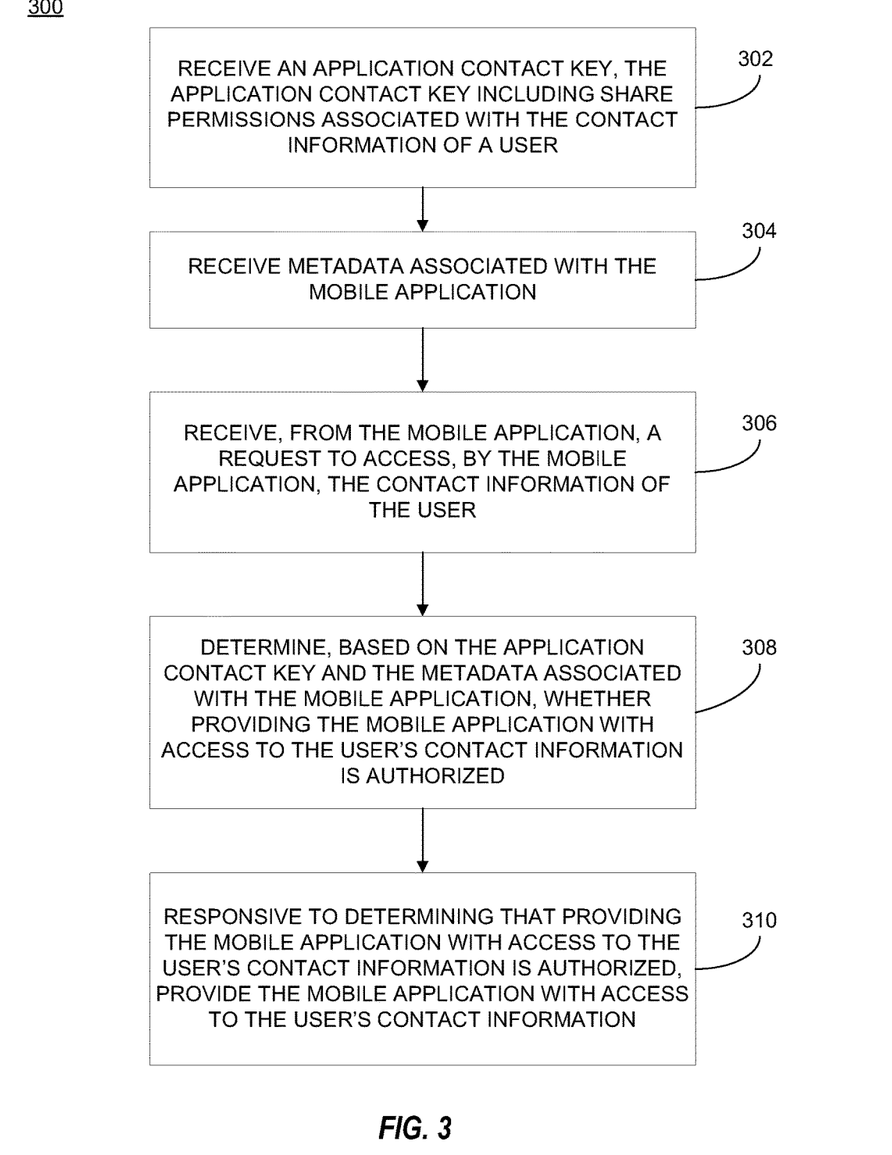
FIG. 3 is a flow diagram of a method 300 for protecting mobile contact information, according to an example embodiment.

FIG. 3 is a flow diagram of a method 300 for protecting mobile contact information, according to an example embodiment. As shown in FIG. 3, and according to an example embodiment, the method 300 can include receiving 302, by a processor and from a computing device, an application contact key, the application contact key including share permissions associated with the contact information of a user. The method 300 can include receiving 304, by the processor and from a mobile application, metadata associated with the mobile application. The method 300 can include receiving 306, by the processor and from the mobile application, a request to access, by the mobile application, the contact information of the user. The method 300 can include determining 308, by the processor and based on the application contact key and the metadata associated with the mobile application, whether providing the mobile application with access to the user's contact information is authorized. The method 300 can include, responsive to determining that providing the mobile application with access to the user's contact information is authorized, providing 310 the mobile application with access to the user's contact information.

Figure 4:
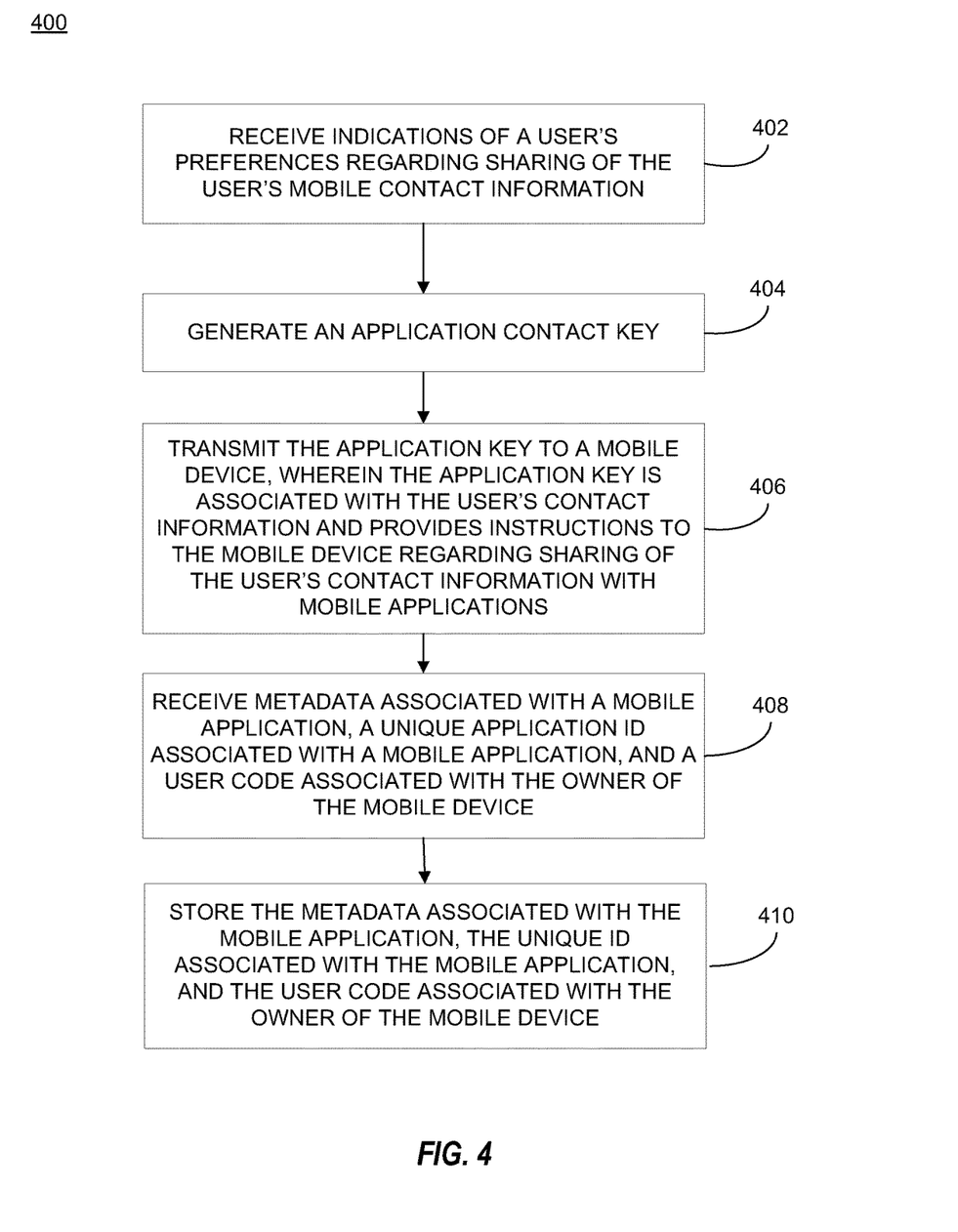
FIG. 4 is a flow diagram of another method 400 for protecting mobile contact information, according to an example embodiment.

FIG. 4 is a flow diagram of another method 400 for protecting mobile contact information, according to an example embodiment. As shown in FIG. 4 and according to an example embodiment, the method 400 can include receiving 402, by a processor, indications of a user's preferences regarding sharing of the user's mobile contact information. The method 400 can include, responsive to receiving the indications of the user's preferences, generating 404, by the processor, an application contact key. The method 400 can include transmitting 406, the application contact key to a mobile device, wherein the application contact key is associated with the user's contact information and provides instructions to the mobile device regarding sharing of the user's contact information with mobile applications. The method 400 can include receiving 408, by the processor and from the mobile device, metadata associated with a mobile application, a unique application ID associated with the mobile application, and a user code associated with the owner of the mobile device. The method 400 can include storing the metadata associated with the mobile application (410), the unique application ID associated with the mobile application, and the user code associated with the owner of the mobile device.

Figure 5:
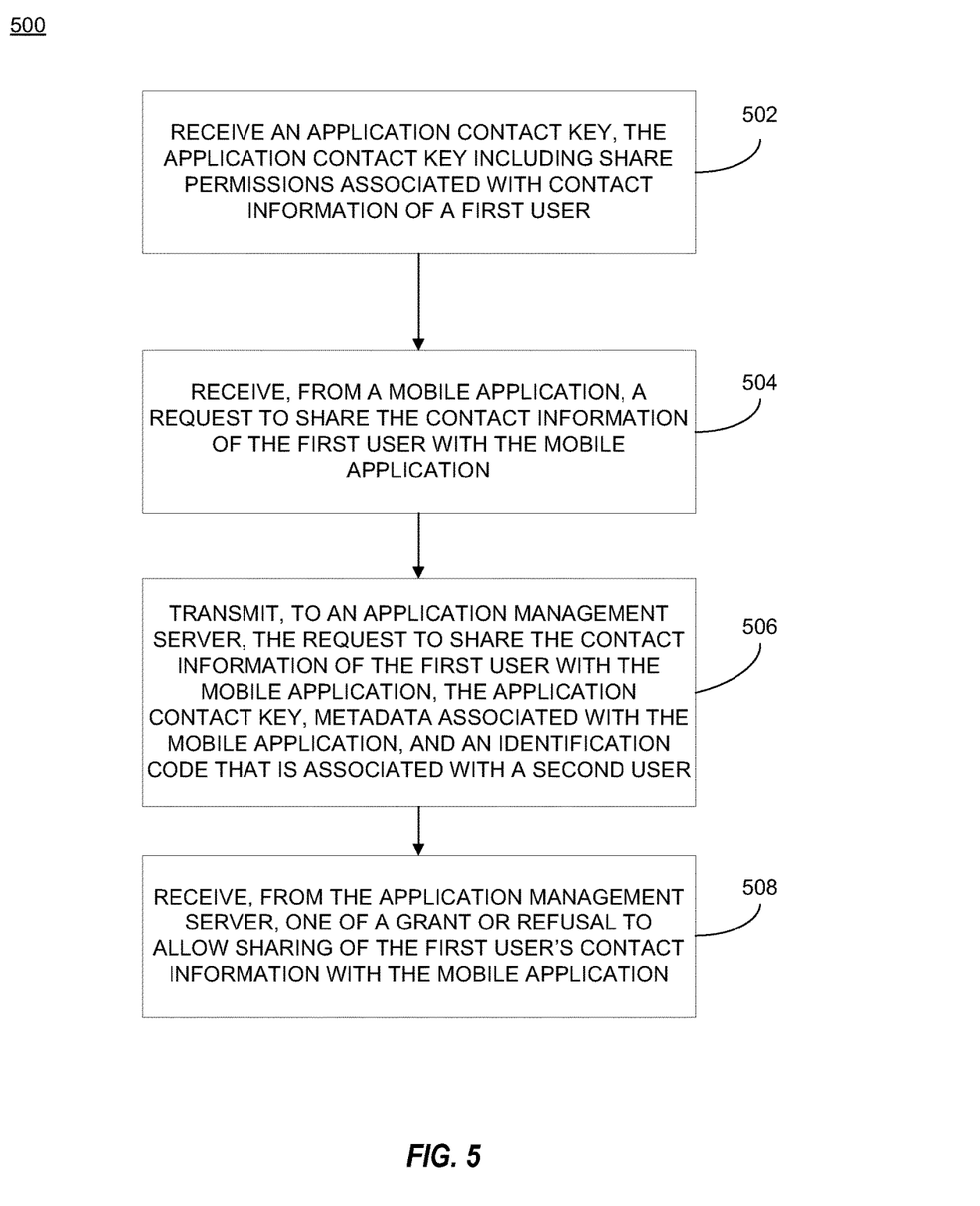
FIG. 5 is a flow diagram of another method 500 for protecting mobile contact information, according to an example embodiment.

FIG. 5 is a flow diagram of another method 500 for protecting mobile contact information, according to an example embodiment. As shown in FIG. 5 and according to an example embodiment, the method 500 can include receiving 502, by a processor and from a computing device, an application contact key, the application contact key including share permissions associated with contact information of a first user. The method 500 can include receiving 504, by the processor and from a mobile application, a request to share the contact information of the first user with the mobile application. The method 500 can include transmitting 506, by the processor and to an application management server, the request to share the contact information of the first user with the mobile application, the application contact key, metadata associated with the mobile application, and an identification code, wherein the identification code is associated with a second user. The method 500 can include receiving 508, by the processor and from the application management server, one of a grant or refusal to allow sharing of the first user's contact information with the mobile application, wherein the grant or refusal is based on the application contact key and the metadata of the mobile application.

It will be understood that the various steps described herein are illustrative only, and that steps may be removed, other steps may be used, or the order of steps may be modified.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method implemented by a computing device, the method comprising:
   receiving, by the computing device, an application contact key corresponding to a contact, the application contact key including share permissions that contain rules regarding applications that are allowed to access a portion of contact information associated with the contact;
   receiving, by the computing device from an application, a request to access the contact information; and
   authorizing, by the computing device, access to the contact information by the application based on a comparison of the rules within the application contact key and metadata associated with the application that is requesting the access.

2. The method of claim 1, wherein the rules specify that the contact information may only be shared with applications of a certain classification.

3. The method of claim 2, wherein the metadata associated with the application includes a classification of the application.

4. The method of claim 3, wherein the authorization comprises comparing the classification of the application to a list of authorized application classifications specified by the rules.

5. The method of claim 1, further comprising transmitting the metadata, a unique application ID, and a user code to an application contact import management system.

6. The method of claim 1, wherein the rules specify one or more applications of the applications that are allowed to access the portion of the contact information associated with the contact.

7. A method implemented by a server, the method comprising:
   receiving, by the server, indications of a user's preferences regarding sharing of the user's contact information;
   responsive to receiving the indications of the user's preferences, generating, by the server, an application contact key associated with the user's contact information, the application contact key including rules regarding applications that are allowed to access the user's contact information;
   transmitting, by the server, the application contact key to a mobile device;
   receiving, by the server and from the mobile device, metadata associated with a mobile application, a unique application ID associated with the mobile application, and a user code associated with an owner of the mobile device; and
   storing, by the server, the metadata associated with the mobile application, the unique application ID associated with the mobile application, and the user code associated with the owner of the mobile device.

8. The method of claim 7, wherein the application contact key is a digital file.

9. The method of claim 7, further comprising:
   receiving, by the server and from the mobile device, a notification that the mobile application desires to access the user's contact information; and
   transmitting, by the server to a computing device of the user, the notification and a prompt to provide an instruction to either allow or deny the sharing of the user's contact information with the mobile device, the notification based on a comparison of the rules within the application contact key and the metadata associated with the mobile application or the unique application ID associated with the mobile application.

10. The method of claim 9, further comprising:
    receiving, by the server and from the computing device of the user, an instruction to either allow or deny the sharing of the contact information; and
    transmitting, by the server to the mobile device, the instruction to either allow or deny the sharing of the contact information.

11. The method of claim 10, wherein the instruction to either allow or deny the sharing of the contact information is an instruction to allow sharing, the method further comprising:
    identifying, by the server, one or more user codes associated with the unique application ID associated with the mobile application;
    transmitting, by the server, the identified one or more user codes associated with the unique application ID associated with the mobile application to the mobile device.

12. The method of claim 11, wherein the one or more user codes enable the mobile application to automatically connect the user with other users corresponding to the one or more user codes.

13. A method implemented by a computing device, the method comprising:
- receiving, by the computing device, an application contact key, the application contact key including share permissions associated with contact information of a first user, the share permissions containing rules regarding applications that are allowed to access the contact information of the first user;
- receiving, by the computing device, a request from a mobile application to access the contact information of the first user;
- transmitting, by the computing device and to an application management server:
  - the request to access the contact information of the first user;
  - the application contact key;
  - metadata associated with the mobile application; and
  - an identification code associated with a second user; and
- receiving, by the computing device and from the application management server, one of a grant or refusal to allow access of the first user's contact information by the mobile application, the grant or refusal being based on a comparison of the rules within the application contact key and the metadata associated with the mobile application that made the request to access the contact information of the first user.

14. The method of claim 13, further comprising:
- responsive to receiving a grant to allow sharing of the first user's contact information, providing, by the computing device, the mobile application access to the first user's contact information.

15. The method of claim 14, wherein the metadata associated with the mobile application includes at least one of: a classification of the mobile application, information regarding how frequently the mobile application is used, information regarding the average usage time of the mobile application, and information regarding whether the mobile application utilizes a GPS receiver of the mobile device.

16. A system comprising:
- at least one memory operatively coupled to at least one processor and configured for storing data and instructions that, when executed by the at least one processor, cause the system to:
- receive an application contact key corresponding to a contact, the application contact key including share permissions of contact information associated with the contact that are established by the contact, the share permissions containing rules regarding applications that are allowed to access the contact information;
- receive metadata associated with a mobile application;
- receive, from the mobile application, a request to access, by the mobile application, the contact information;
- determine, based on a comparison of the rules within the application contact key and the metadata associated with the mobile application, whether access to the contact information by the mobile application that is requesting the access is authorized; and
- responsive to determining that access to the contact information is authorized, provide the mobile application with access to the contact information.

17. The system of claim 16, wherein the rules specify that the contact information may only be shared with mobile applications of a certain classification.

18. The system of claim 17, wherein the metadata associated with the mobile application includes a classification of the mobile application.

19. The system of claim 17, wherein the determination comprises comparing the classification of the mobile application to a list of authorized mobile application classifications specified by the rules.

20. The system of claim 16, wherein the rules specify applications of a certain type that are allowed to access the contact information associated with the contact.

* * * * *